Patented Feb. 18, 1947

2,416,264

UNITED STATES PATENT OFFICE 2,416,264

QUATERNARY AMMONIUM HALOETHERS

Clinton W. MacMullen and Herman A. Bruson, Philadelphia, Pa., assignors to Röhm & Haas Company, Philadelphia, Pa., a corporation of Delaware No Drawing. Application October 9, 1943, Serial No. 505,662

5 Claims. (Cl. 260—567.6)

This invention relates to aryl aliphatic ethers which contain an aromatic nucleus substituted by a quaternary ammonium methyl group and to processes for preparing such ethers. More particularly, this invention relates to ethers of the formula (ZCH$_2$)$_n$ArXAY wherein Z is a quaternary ammonium group, $n$ is an integer having a value of one or two, Ar is a carbocyclic aromatic nucleus, X is oxygen or sulfur, A is an alkylene group the chain of which may be interrupted by oxygen or sulfur, and Y is a polar group based upon the elements carbon, hydrogen, halogens, oxygen, and nitrogen, including such groups as —OH, —O-alkyl, —O-aryl, —CO-alkyl, —CO-aryl, —OCO-alkyl, —OCO-aryl, —COOH, —COO-alkyl, —CONHR', —CONHR'', —halogen, —NR'R'', or —NR'R''R''' anion, R'—R''' representing hydrogen or aliphatic, cycloaliphatic, arylaliphatic, heterocyclic, or aryl groups.

The quaternary ammonium methyl ethers of this invention may be prepared by reacting a tertiary amine with a halomethyl ether of the formula (ClCH$_2$)$_n$ArXAY or by reacting an aminomethyl ether of the formula (Z'CH$_2$)$_n$ArXAY wherein Z' is a tertiary amino group with an alkylating or aralkylating agent.

As a halomethyl ether, there may be used any of the ethers described in the applications having Serial Numbers 415,034, 415,035, and 415,036, all filed September 2, 1941, now issued as United States Patents Nos. 2,291,526, 2,291,527, and 2,291,528, respectively, issued July 28, 1942, and in United States Patent No. 2,266,737, issued December 23, 1941.

Typical halomethyl aryl aliphatic ethers which are suitable as starting materials include such compounds as the following:

(ClCH$_2$)$_n$ArOCH$_2$CH$_2$OH, where $n$ has a value of one or two,
BrCH$_2$C$_6$H$_4$OCH$_2$CH$_2$OCH$_3$
BrCH$_2$C$_6$H$_4$OCH$_2$CH$_2$OC$_6$H$_5$
BrCH$_2$C$_6$H$_4$OCH$_2$CH$_2$OC$_6$H$_4$CH$_2$Br
(ClCH$_2$)$_2$C$_6$H$_3$SCH$_2$CH$_2$OC$_2$H$_5$
ClCH$_2$C$_6$H$_4$OCH$_2$CH$_2$SC$_6$H$_5$
ClCH$_2$C$_6$H$_4$OCH$_2$CH$_2$OCH$_2$CH$_2$OC$_2$H$_5$
(HalCH$_2$)$_n$Ar(OCH$_2$CH$_2$)$_m$O-alkyl, where $m$ is an integer from one to ten or more and the alkyl group contains from one to eighteen carbon atoms,
(ClCH$_2$)$_n$ArOCH$_2$CH$_2$CO-alkyl
ClCH$_2$C$_6$H$_4$OCH$_2$COC$_4$H$_9$
ClCH$_2$C$_6$H$_4$OCH$_2$COC$_6$H$_5$
ClCH$_2$C$_6$H$_4$O(CH$_2$)$_m$COR'
ClCH$_2$C$_6$H$_4$OC$_2$H$_4$OC$_2$H$_4$COR'
ClCH$_2$C$_6$H$_4$OCH$_2$CH$_2$OCH$_2$CH$_2$OCOR
ClCH$_2$C$_6$H$_4$OCH$_2$CH$_2$OCOC$_3$H$_7$
ClCH$_2$C$_6$H$_4$OCH$_2$CH$_2$OCO-aryl
ClCH$_2$C$_6$H$_4$OCH$_2$CH$_2$OCOC$_6$H$_5$
(ClCH$_2$)$_n$ArOCH$_2$COO-alkyl
(ClCH$_2$)$_n$ArOCH$_2$CH$_2$COO-alkyl
(ClCH$_2$)$_n$ArOCH$_2$CH$_2$Cl
BrCH$_2$C$_6$H$_4$OCH$_2$CH$_2$Br
ClCH$_2$C$_6$H$_4$OCH$_2$CH$_2$OCH$_2$CH$_2$Br
ClCH$_2$C$_6$H$_4$SCH$_2$CH$_2$Cl
ClCH$_2$C$_6$H$_4$OCH$_2$CH$_2$OC$_6$H$_4$CH$_2$Cl
ClCH$_2$C$_6$H$_4$OCH$_2$CH$_2$SAr
ClCH$_2$C$_6$H$_4$OCH$_2$CH$_2$OCH$_2$Cl
(ClCH$_2$)$_n$ArOC$_3$H$_6$OC$_3$H$_6$Cl
BrCH$_2$C$_6$H$_4$OCH$_2$CH$_2$SCH$_2$CH$_2$Br
(ClCH$_2$)$_n$ArOCH$_2$CH(CH$_3$)OCH(CH$_3$)CH$_2$Cl
ClCH$_2$C$_6$H$_4$OC$_4$H$_8$Cl
(ClCH$_2$)$_n$C$_6$H$_{5-n}$(OC$_2$H$_4$)$_m$OC$_2$H$_4$Cl
(ClCH$_2$)$_2$C$_6$H$_2$(CH$_3$)OCH$_2$CH$_2$Cl
(BrCH$_2$)$_2$C$_6$H$_2$(C$_8$H$_{17}$)OC$_2$H$_4$OC$_2$H$_4$Cl
(ClCH$_2$)$_2$C$_6$H$_2$(C$_4$H$_9$)OC$_3$H$_6$OC$_3$H$_6$Cl
(ClCH$_2$)$_n$C$_6$H$_{4-n}$(C$_{18}$H$_{37}$)OCH$_2$CH$_2$Cl
(ClCH$_2$)$_n$C$_6$H$_{4-n}$(CH$_3$)OCH$_2$CH$_2$OC$_6$H$_{4-n}$(CH$_3$)(CH$_2$Cl)$_n$
(ClCH$_2$)$_2$C$_6$H$_3$OC$_2$H$_4$OC$_2$H$_4$OC$_2$H$_4$Cl
(ClCH$_2$)$_2$C$_6$H$_3$OCH$_2$COOC$_{12}$H$_{25}$ In the above compounds the aromatic nucleus, designated Ar in generic terms and shown specifically as the phenyl group, may contain nuclear substituents such as alkyl, cycloalkyl, aryl, nitro, halogen, acyl, or other group which is stable under the conditions used in the preparation of the halomethyl ethers, that is, in the presence of a hydrogen halide and formaldehyde. This requirement excludes phenolic hydroxyl, amino, diazo, and aldehyde groups. The aromatic nucleus may be mononuclear or polynuclear, as in benzene, naphthalene, phenanthrene, anthracene, diphenyl, etc.

As reactant with one of the above halomethyl aryl aliphatic ethers, there is used a secondary or tertiary amine to yield a tertiary amine or a quaternary ammonium salt. A product in the form of a tertiary amine may be converted by reaction with an alkylating or aralkylating agent into a quaternary ammonium salt. The reacting amines may be members of the aliphatic, arylaliphatic, cycloaliphatic, or aryl series or may contain substituents from two or more of these series. Typical amines include dimethylamine, diethylamine, dibutylamine, diethanolamine, diallylamine, dimethallylamine, diisooctylamine, dodecylmethylamine, octadecylmethylamine, methylbenzylamine, dicyclohexylamine, methylaminobenzene, cyclic amines such as morpholine, piperidine, pyrrolidine, etc., trimethylamine, benzyldimethylamine, dodecyldimethylamine, cyclohexyldimethylamine, dimethylaminobenzene, trihexyldimethylamine, pyridine, etc. In fact, any secondary mono-amine appears to be useful in forming the tertiary aminomethyl aryl aliphatic ethers which are converted to the quaternary ammonium compounds of this invention. Likewise, any tertiary mono-amine may be used to give quaternary compounds by direct reaction with the halogen groups. It will be noted that, in the cases of such amines as morpholine and pyridine, the groups attached to the nitrogen are di- or tri-valent groups which form heterocycles with the nitrogen.

The reaction between halomethyl arylaliphatic ether and secondary amine is carried out by reacting said ether with an amine in the presence of a base at a temperature between about $-20°$ C. and about $250°$ C. If desired, the reaction may be performed in the presence of a solvent, such as dioxane, toluene, water, or the like. When several types of labile halogens are present in the ether, the reaction may be so conducted as to replace only one type or so as to replace all of the halogens. If the reaction is carried out above about $100°$ C., the various labile halogens are replaced by amine groups. Between $-20°$ C. and about $100°$ C., however, only the halogen of the halomethyl groups reacts. In a similar way, the reaction product may be varied in the case of the ethers having —COOH, or —COOR, or —OCOR groups by variations in temperatures of reaction. Thus, in the lower range secondary amines react only with the halogen of the halomethyl group, whereas in the upper temperature range there occurs not only the reaction with the halomethyl group but also reaction with the carboxyl group leading to di-substituted carboxylic amides and to alcohols.

Because of the difference in reactivity of the different types of labile halogens, they may be replaced with one type of amino nitrogen group or with different such groups. Thus, the compound $R'R''NCH_2ArXC_2H_4Cl$ may be formed below $100°$ C. and this reacted above $100°$ C. to form $R'R''NCH_2ArXC_2H_4NR'''R''''$.

Tertiary amines prepared by reaction of halomethyl ether and secondary amine may be converted to the corresponding quaternary ammonium salt by reaction with such compounds as the dialkyl sulfates, as, for example, diethyl sulfate, alkyl halides as, for example, methyl iodide, bromide, or chloride, benzyl halides, esters, as, for example, methyl formate, ethyl chloroacetate, or methyl-p-toluene sulfonate, alkyl halomethyl ethers as, for example, bromomethoxybutane, or a halomethyl aryl ether, such as chloromethyl phenoxyethyl chloride, etc.

The quaternary ammonium salts of this invention may also be formed by reacting together a tertiary amine and a halomethyl ether of the formula (Halogen $CH_2)_n ArXAY$ Again by controlling conditions as to temperature of reaction in general below $100°$ C., only the halomethyl group may be reacted. More vigorous reaction conditions cause the tertiary amine to react not only with the halomethyl group but also with reactive Y groups.

The quaternary ammonium ethers of this invention may be used as textile finishing agents, disinfectants, bactericides, wetting agents, detergents, insecticidal preparations, drugs, fungicides, etc.

The invention is illustrated by the following examples:

Example 1

Seventy-three grams of diethylamine was added to a cold solution of forty grams of sodium hydroxide in 120 grams of water. To this cold mixture was added with stirring seventy grams of chloromethyl o-cresoxy ethoxy ethyl chloride at $-6°$ to $-11°$ C. The milky viscous mixture was stirred for twenty-five hours, during which time the temperature rose to $27°$ C. The lower aqueous layer was discarded, and the oil taken up in benzene and washed twice with water. The crude amine was converted to its hydrochloride with hydrochloric acid, and the aqueous mixture steam-distilled to remove insoluble impurities. The residue stood a few days, and the slightly turbid aqueous solution was decanted from a few grams of heavy insoluble oil and clarified by agitation with an adsorbent clay. The clear amber filtrate was neutralized with sodium hydroxide solution, and the free amine liberated was taken up in benzene and washed. The solvent was distilled off in vacuo, and the residual oil clarified by stirring with 2.5 grams of activated charcoal. The forty-two grams of yellow oil obtained after filtration corresponded in composition to diethylaminomethyl o-cresoxy ethoxy ethyl chloride having the formula $(C_2H_5)_2NCH_2C_6H_3(CH_3)OC_2H_4OC_2H_4Cl$ A quaternary ammonium salt was prepared by refluxing ten grams of the diethylaminomethyl o-cresoxy ethoxy ethyl chloride with eleven grams of ethyl bromide for one hour at $54°$ C. The excess ethyl bromide was then distilled out, leaving a viscous paste which did not crystallize when cooled. The ($\beta$-chloroethoxy-ethoxy)-methylbenzyl triethyl ammonium bromide had the following formula

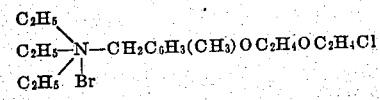

Another quaternary ammonium derivative was prepared by warming ten grams of the diethylaminomethyl o-cresoxy ethoxy ethyl chloride with five grams of benzyl chloride for eight hours at $70°$ C. The ($\beta$-chloroethoxy-ethoxy)-methylbenzyl diethyl benzyl ammonium chloride was a viscous orange oil having the formula

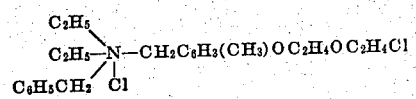

A quaternary ammonium salt was prepared by heating six grams of the diethylaminomethyl o-cresoxy ethoxy ethyl chloride with four grams of decyl chloromethyl ether for four and a half hours at $90°$ C. The viscous red paste obtained was soluble in water with suds, and the product had the formula

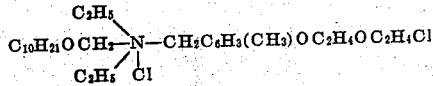

Example 2

A mixture of 156 grams of p-tert.-octyl phenoxy ethoxy ethyl chloride, thirty grams of paraformaldehyde, and 200 grams of ethylene dichloride was stirred and saturated with gaseous hydrogen chloride for seven hours at 50°–53° C. The reaction mixture was washed with ice water, dried with anhydrous sodium sulfate, filtered, and the solvent distilled off in vacuo, leaving 140 grams of clear amber oil.

This was crude chloromethyl p-tert.-octyl phenoxy ethoxy ethyl chloride which was added during thirty-five minutes to a mixture of 360 grams of 25% dimethylamine solution and eighty grams of sodium hydroxide at 3°–5° C., and the mixture stirred for nine hours at 5°–18° C. The oil layer was converted to the soluble amine hydrochloride with hydrochloric acid, and the aqueous solution steam-distilled to remove non-soluble impurities. The residual viscous, amber, clear solution was neutralized with sodium hydroxide to liberate the amine which was taken up in benzene, washed twice with water, dried with anhydrous sodium sulfate, filtered, and the solvent distilled off in vacuo. The dimethylaminomethyl p-tert.-octyl phenoxy ethoxy ethyl chloride was obtained as a clear, amber, viscous oil having the formula $$(CH_3)_2NCH_2C_6H_3(C_8H_{17})OC_2H_4OC_2H_4Cl$$

A quaternary ammonium salt was prepared by heating 7.5 grams of dimethylaminomethyl p-tert.-octyl phenoxy ethoxy ethyl chloride with three grams of methallyl chloride at 90° C. for five hours. The ($\beta$-chloroethoxy-ethoxy)-p-tert.-octyl-benzyl dimethyl methallyl ammonium chloride was obtained as a clear yellow viscous oil, soluble in water with suds, having the formula

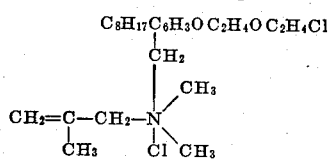

Example 3

Forty-four grams of morpholine was mixed with a solution of twenty grams of sodium hydroxide in forty grams of water, and to this cold mixture was added, with stirring, 118 grams of chloromethyl p-tert.-octyl phenoxy ethoxy ethyl chloride during thirty minutes at 55°–70° C. The turbid brown mixture was stirred for five and a half hours at 70°–60° C. To the cooled reaction mixture was added 80 cc. of concentrated hydrochloric acid and 200 cc. of water, and the mixture steam-distilled to remove insoluble impurities. The residue was diluted with water and clarified by stirring twice with ten and twenty grams of activated charcoal, respectively. The aqueous solution was filtered, and neutralized to liberate the amine.

The amine was taken up in benzene and washed three times with water. The benzene was distilled off in vacuo, leaving 93 grams of viscous amber oil consisting of morpholinomethyl p-tert.-octyl phenoxy ethoxy ethyl chloride which had the formula

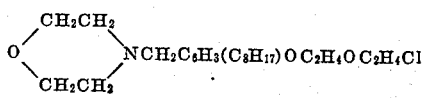

A quaternary ammonium salt was prepared by mixing eight grams of morpholinomethyl p-tert.-octyl phenoxy ethoxy ethyl chloride with four grams of decyl chloromethyl ether at 15° C. and stirring for ten minutes at 30°–40° C. A very viscous, clear, amber oil was obtained, soluble in water with suds. The aqueous solution was purified by steam distillation and by agitation with an adsorbent clay. ($\beta$-Chloroethoxy-ethoxy)-(p-tert.-octyl)-benzyl decyl-oxymethyl morpholinium chloride had the following formula:

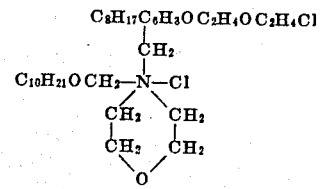

Another quaternary ammonium derivative was prepared by heating eight grams of morpholinomethyl p-tert.-octyl phenoxy ethoxy ethyl chloride with 2.5 grams of ethyl chloroacetate at 100°–200° C. for four hours. The viscous oil was extracted with hot water and the aqueous solution clarified with adsorbent clay and activated silica. The clear, amber, aqueous solution contained ($\beta$-chloroethoxy ethoxy)-(p-tert.-octyl)-benzyl carbethoxymethyl morpholinium chloride:

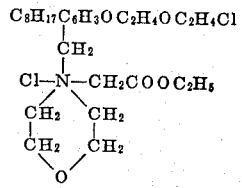

A quaternary ammonium salt was prepared by heating eight grams of morpholinomethyl p-tert.-octyl phenoxy ethoxy ethyl chloride with 3.5 grams of nitrobenzyl chloride at 140°–185° C. for four hours. ($\beta$-chloroethoxyethoxy)-(p-tert.-octyl)-benzyl nitro-benzyl morpholinium chloride was a viscous dark oil, soluble in water with suds.

Example 4

Ninety-nine grams of chloromethyl p-tert.-octyl phenoxy ethoxy ethyl chloride at 31°–40° C. was added during seventeen minutes to a cold mixture of fifty grams of dicyclohexylamine, eleven grams of water, and eleven grams of sodium hydroxide. The mixture was stirred for seven hours at 79°–95° C., washed with water, and clarified by agitation with fifteen grams of active charcoal. The viscous yellow oil was dicyclohexylamino-methyl p-tert.-octyl phenoxy ethoxy ethyl chloride, having the formula $$(C_6H_{11})_2NCH_2C_6H_3(C_8H_{17})OC_2H_4OC_2H_4Cl$$

A quaternary ammonium salt was prepared by heating ten grams of dicyclohexylaminomethyl p-tert.-octyl phenoxy ethoxy ethyl chloride with three grams of ethyl chloroacetate for five hours at 140°–180° C. The ($\beta$-chloroethoxy-ethoxy)-(p-tert.-octyl) benzyl dicyclohexyl carbethoxymethyl ammonium chloride was obtained as a yellow paste, having the formula

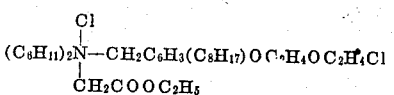

Example 5

A mixture of 145 grams of dimethylaminomethyl p-tert.-octyl phenoxy ethoxy ethyl chloride (prepared as in Example 2), 180 grams of 25% dimethylamine, 1000 grams of water, and 20 grams of sodium hydroxide was stirred and heated in an autoclave for 6.5 hours at 95°–159° C. (at 15–90 pounds gauge pressure). The reaction mixture cooled overnight, and the oil layer was separated, washed with water, and distilled in vacuo. The clear yellow oil, boiling at 170°–190° C. at 1 mm. pressure, was dimethylaminomethyl p-tert.-octyl phenoxy ethoxy ethyl dimethylamine, having the formula

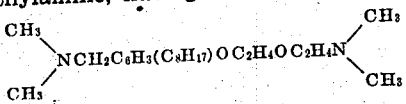

A quaternary ammonium salt was prepared by mixing eight grams of dimethylaminomethyl p-tert.-octyl phenoxy ethoxy ethyl dimethylamine with 5.6 grams of methyl iodide. An exothermic reaction took place, and the mixture was cooled. The solid mass was recrystallized from ethylene dichloride and petroleum ether (90°–100° C.). The dimethylaminomethyl p-tert.-octyl phenoxy ethoxy ethyl dimethylamine di-methiodide was obtained as a colorless crystalline solid, soluble in water, and having the formula

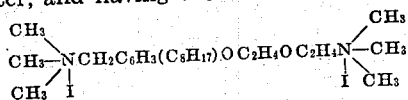

A quaternary ammonium salt was also prepared by mixing eight grams of dimethylaminomethyl p-tert.-octyl phenoxy ethoxy ethyl dimethylamine with six grams of diethyl sulfate. An exothermic reaction occurred, yielding a viscous paste when cooled, which was clearly soluble in water with suds. The di-quaternary salt had the following formula

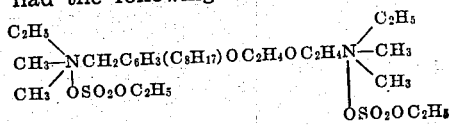

Example 6

Three hundred sixty grams of 25% dimethylamine solution was added to thirty-two grams of di-(chloromethyl) phenoxy ethyl chloride and the mixture stirred and heated for fourteen hours at 41°–69° C. A solution of twelve grams of sodium hydroxide in 120 cc. of water was added, and the mixture stirred for five hours. The mixture was filtered, and the filtrate extracted four times with benzene. The benzene was distilled off and the residual oil distilled in vacuo. The yellow oil boiling at 110°–140° C./1 mm. was di-(dimethylamino-methyl)phenoxy ethylene, having the formula

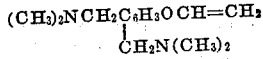

Example 7

Sixty grams of di-(chloromethyl)phenoxy ethoxy ethyl chloride was added to a cold mixture of forty-eight grams of water, sixteen grams of sodium hydroxide, and thirty-five grams of morpholine at 25°–45° C. and the mixture stirred for six hours at 95° C. The oil layer was separated, washed, taken up in benzene and dried, and the benzene distilled off in vacuo. The clear amber oil obtained was di-(morpholino-methyl) phenoxy ethoxy ethyl chloride having the formula

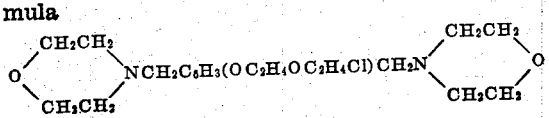

A quaternary ammonium derivative was prepared by stirring a mixture of forty grams of di-(morpholinomethyl) phenoxy ethoxy ethyl chloride, twenty-two grams of benzyl chloride, and 125 grams of toluene at 80°–90° C. for four hours. The reaction mixture was concentrated, and steam-distilled to remove water-insoluble impurities. A small amount of heavy brown oil layer was separated off on standing, and the quaternary ammonium salt was obtained as a clear aqueous solution.

A quaternary ammonium salt was prepared by warming four grams of di-(morpholinomethyl) phenoxy ethoxy ethyl chloride with two grams of chloromethyl o-cresoxy ethyl chloride,

at 95° C. for three hours. The mixture became very viscous and, when the mixture was cooled, the quaternary ammonium salt was obtained as a solid which was soluble in water.

Example 8

One hundred eighty grams of chloromethyl phenoxy ethyl acetate, $ClCH_2C_6H_4OC_2H_4OCOCH_3$ (containing also some di-chloromethyl phenoxy ethyl acetate), 1080 grams of 25% dimethylamine, 100 grams of water, and 80 grams of sodium hydroxide were stirred in an autoclave and heated for five hours at 135°–165° C. The mixture cooled overnight, and the viscous sticky oil was separated from the aqueous layer with the aid of benzene. The solvent was distilled off and the residual oil distilled in vacuo. The amino ether alcohol, formed by substitution of the halogen and ammonolysis of the ester groups, was obtained as a viscous oil, boiling at 133°–165° C./1–2 mm. The product was a mixture of dimethylaminomethyl phenoxy ethanol

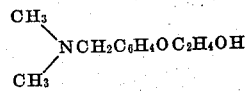

and di-(dimethylaminomethyl) phenoxy ethanol

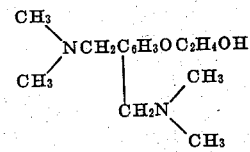

Example 9

A mixture of sixty-nine grams of phenyl hydroxyethyl ether, $C_6H_5OC_2H_4OH$, sixty grams of paraformaldehyde, and 200 cc. of petroleum ether was stirred and saturated with hydrogen chloride for six hours at 30°–40° C. The crude oil was washed with water, dried with anhydrous sodium sulfate, filtered, and the solvent distilled off under reduced pressure.

Ninety-six grams of the chloromethyl derivative thus obtained was added to a cold mixture of 540 grams of 25% dimethylamine solution and 120 grams of sodium hydroxide during twenty minutes at 4°–20° C., and the mixture stirred for twenty-three hours at 20°–30° C. The oil was separated, taken up in benzene, washed with water, dried with anhydrous sodium sulfate, and distilled in vacuo. The dimethylaminomethyl derivative of phenoxy ethanol was obtained as a clear, pale yellow oil, boiling at 140°–160° C./2 mm. The product was a mixture of the monoand di-dimethylaminomethyl derivatives having the formulas

and
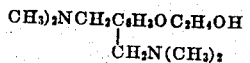

A quaternary ammonium salt was prepared by heating four grams of the dimethylaminomethyl derivative of phenoxy ethanol obtained above and three grams of n-hexyl bromide for a half hour at 95° C. The hot viscous reaction mixture was cooled to a sticky solid, which was soluble in water.

Example 10

A mixture of sixty-two grams of phenoxy acetone, eighty-one grams of 37% formaldehyde, and three hundred grams of dioxane was stirred and saturated with hydrogen chloride for seven and one-half hours at 10°–30° C. The clear dark brown solution was poured into a large volume of ice water, the oil extracted with benzene, washed, and dried.

The benzene solution of di-(chloromethyl) phenoxy acetone, containing also some chloromethyl phenoxy acetone, was added to a cold mixture of 180 grams of 25% dimethylamine solution and forty grams of sodium hydroxide at 10°–20° C., and the heterogeneous brown mixture stirred for fifteen hours at 20°–30° C. The benzene layer was distilled in vacuo, and the dimethylaminomethyl derivative was obtained as a clear yellow oil boiling at 120°–155° C./2 mm., sparingly soluble in water, but clearly soluble in dilute hydrochloric acid. The product was di-(dimethylaminomethyl) phenoxy acetone

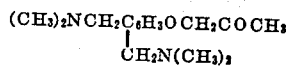

containing also some dimethylaminomethyl phenoxy acetone

Quaternary ammonium salts may be formed therefrom as in the previous example.

Example 11

A mixture of 138 grams of phenyl hydroxyethyl ether, $C_6H_5OC_2H_4OH$, 120 grams of para-formaldehyde, and three hundred grams of dioxane was stirred and saturated with hydrogen chloride for fifteen hours at 50°–60° C. and for four hours at 10°–20° C. The reaction mixture was poured into one liter of ice water, the oil layer separated and taken up in 300 cc. of benzene, dried with anhydrous sodium sulfate and filtered. Half of the benzene solution was stripped in vacuo to give a clear amber oil which was di-chloromethyl phenoxy ethanol, containing also some chloromethyl phenoxy ethanol.

Two hundred forty-five grams of the benzene solution of the chloromethyl derivative thus obtained was added to a cold mixture of 540 grams of 25% dimethylamine solution and 120 grams of sodium hydroxide during fifteen minutes at 0°–10° C. and the turbid milky solution stirred for twenty-five hours at 10°–20° C. The oil layer was separated, taken up in benzene, washed with water, dried, and distilled in vacuo. A clear, colorless oil was obtained, boiling at 150°–170° C./2 mm., which was di-dimethylaminomethyl phenoxy ethanol, containing also some dimethylaminomethyl phenoxy ethanol.

Example 12

Forty-two grams of butyl chloromethyl-phenoxy-acetate, $ClCH_2C_6H_4OCH_2COOC_4H_9$ (containing also some butyl dichloromethyl-phenoxy-acetate), was mixed with eighty-seven grams of morpholine with the evolution of considerable heat. The mixture stood several days and was then heated under reflux at 117°–130° C. for four hours. The reaction mixture was steam-distilled for one hour, neutralized with dilute sodium hydroxide solution, and the product extracted with benzene. The solvent was distilled off and the oil distilled in vacuo. A viscous deep yellow oil was obtained, boiling at 237°–275° C./1 mm., which was morpholinomethyl-phenoxy acetyl morpholine:

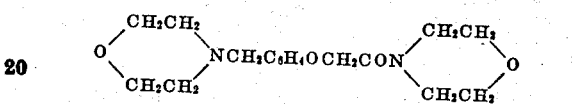

containing also some di-morpholinomethyl-phenoxy acetyl morpholine:

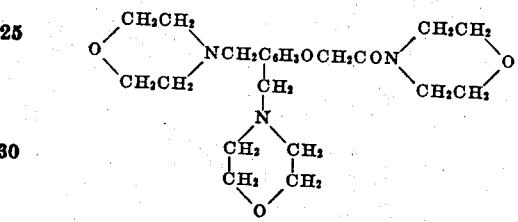

Quaternary salts may be formed therefrom by reacting with an alkylating or aralkylating agent as in previous examples.

Example 13

A mixture of 150 parts of octyldimethylamine and 190 parts of chloromethyl phenoxyethyl chloride was heated to about 80° C. for several hours. The resulting product was soluble in water. It was a product of the formula

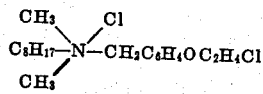

Example 14

A mixture was made with eighty parts of pyridine and 150 parts of chloromethyl phenoxyethoxyethyl chloride and heated gradually up to about 100° C. The resulting product was soluble in water and showed the typical behavior of quaternary salts.

Example 15

A mixture was prepared from 200 parts of benzyl dimethylamine and 295 parts of chloromethyl cresoxyethoxyethoxyethyl chloride and the temperature thereof carried to about 100° C. A water-soluble product was obtained.

Example 16

Three hundred eighty-two grams of an emulsion containing 21% of chloromethyl p-tert.-octyl phenoxy-ethoxy-ethoxy-ethyl dodecyl ether,

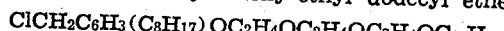

was added to a cold mixture of one hundred grams of water, twenty grams of soduim hydroxide, and one hundred grams of monoisopropyl amine, and the mixture stirred for fifteen hours at 20°–25° C. Then 20 cc. of 25% sodium hydroxide solution was added and stirring continued for five hours. The oil layer was separated, taken up in benzene, washed, dried, and distilled in vacuo. The clear red oil, boiling at 150°–250° C./2 mm., was isopropylamino methyl p-tert.-octyl phenoxy-ethoxy-ethoxy ethyl lauryl ether $$\begin{array}{c}CH_3\\ \diagdown\\ HCNCH_2C_6H_3OC_2H_4OC_2H_4OC_2H_4OC_{12}H_{25}\\ \diagup \quad |\quad\quad |\\ CH_3\quad H\quad\; C_8H_{17}\end{array}$$

This amine is readily converted to the quaternary ammonium derivative by reacting it with an alkylating agent such as benzyl chloride or bromide.

According to this invention, compounds of the general formula (Halogen—$CH_2$)$_n$ArXAY react with secondary amines to form tertiary amines of the formula (Z'$CH_2$)$_n$ArXAY which are then converted to the corresponding quaternary amino compound by the addition thereto of an alkylating or aralkylating agent.

Alternatively, the compound (Halogen $CH_2$)$_n$ArXAY may be reacted with any tertiary amine,

NR'R''R''' where R', R'', and R''' are aliphatic, alicyclic, aralkyl, heterocyclic, or aryl groups.

The quaternary ammonium group, Z—, in the general formula (Z$CH_2$)$_n$ArXAY may take the forms $$\begin{array}{ccc} a\diagdown\quad\diagup c & a\diagdown & \\ \quad N- & \;\;e=N- & f\equiv N-\\ b\diagup\quad\diagdown d & d\diagup\quad\diagdown d & \diagdown d \end{array}$$

where $a$, $b$, and $c$ are monovalent groups, $e$ is a saturated divalent group, $f$ is an unsaturated trivalent group, and $d$ is an anion.

This application is a continuation-in-part of application Serial No. 445,452, filed June 2, 1942. It is particularly directed to quaternary ammonium compounds of the formula (Z$CH_2$)$_n$ArXA halogen prepared from halomethyl ethers of the general formula (Halogen $CH_2$)$_n$ArXA halogen

We claim:
1. Compounds of the formula

(Z$CH_2$)$_n$ArOA halogen wherein Z represents the group $$\begin{array}{c}R_1\qquad anion\\ \diagdown\\ R_2-N\\ \diagup\\ R_3\end{array}$$

wherein $R_1$, taken individually, represents monovalent, aliphatic, cyclohexyl, and benzyl groups, $R_2$, taken individually, represents alkyl and cyclohexyl groups, $R_3$, taken individually, represents monovalent aliphatic groups, $R_1$ and $R_2$, taken together, represent divalent saturated aliphatic hydrocarbon and ether chains which form a heterocycle with the nitrogen, and $R_1$, $R_2$, and $R_3$, taken together, represent a trivalent unsaturated hydrocarbon chain which forms a heterocycle with the nitrogen, $n$ is an integer having a value from one to two, inclusive, Ar is a carbocyclic aromatic group, and A' is selected from a member of the class consisting of alkylene groups and alkylene groups the chain of which is interrupted by oxygen.

2. Compounds of the formula $$\begin{array}{c}CH_3\\ \diagdown\\ CH_3-N-CH_2\text{ phenyl }OA\text{ halogen}\\ \diagup\; |\\ C_6H_5CH_2\;\; Cl\end{array}$$

wherein A is an alkylene group which is interrupted by oxygen.

3. A compound of the formula $$\begin{array}{c}C_2H_5\\ \diagdown\\ C_2H_5-N-CH_2C_6H_3(CH_3)OC_2H_4OC_2H_4Cl\\ \diagup\; |\\ C_6H_5CH_2\;\; Cl\end{array}$$

4. A compound of the formula $$\begin{array}{c}C_2H_5\\ \diagdown\\ C_{10}H_{21}OCH_2-N-CH_2C_6H_3(CH_3)OC_2H_4OC_2H_4Cl\\ \diagup\; |\\ C_2H_5\;\; Cl\end{array}$$

5. A compound of the formula $$\begin{array}{c}CH_3\\ \diagdown\\ CH_3-N-CH_2C_6H_3(CH_3)OC_2H_4OC_2H_4Cl\\ \diagup\; |\\ C_6H_5CH_2\;\; Cl\end{array}$$

CLINTON W. MacMULLEN.
HERMAN A. BRUSON.

REFERENCES CITED

The following references are of record in the file of this patent:

UNITED STATES PATENTS

| Number | Name | Date |
|---|---|---|
| 2,291,528 | Bruson | July 28, 1942 |
| 2,336,465 | Buck | Dec. 14, 1943 |